United States Patent [19]

Lantrip et al.

[11] Patent Number: 4,993,658
[45] Date of Patent: Feb. 19, 1991

[54] VIDEO TAPE CASSETTE WINDING DEVICE

[76] Inventors: Sandra T. Lantrip; Judy A. Anselmo; George A. Thibodaux, all of P.O. Box 135, Ethel, La. 70730

[21] Appl. No.: 435,338
[22] Filed: Nov. 13, 1989
[51] Int. Cl.5 ............................................. G11B 15/32
[52] U.S. Cl. ...................................... 242/179; 242/96; 242/199
[58] Field of Search ................. 242/179, 197, 96, 199; 81/488, 176.1, 176.15

[56] References Cited

U.S. PATENT DOCUMENTS

| 3,999,725 | 12/1976 | Arbib | 242/179 X |
| 4,147,314 | 4/1979 | Traulsen | 242/179 |
| 4,702,434 | 10/1987 | Brauer | 242/199 X |
| 4,703,903 | 11/1987 | Gilmore | 242/179 |
| 4,899,946 | 2/1990 | Espin et al. | 242/96 X |

Primary Examiner—Joseph J. Hail, III
Assistant Examiner—William G. Battista, Jr.
Attorney, Agent, or Firm—William David Kiesel; Robert C. Tucker; Timothy J. Monahan

[57] ABSTRACT

A device for hand winding video tapes having a reel release mechanism required to disengage a video tape breaking mechanism. The reel release mechanism is attached to an elongated member together with a gear assembly which is used in the manual rewinding of the video tape.

9 Claims, 3 Drawing Sheets

4,993,658

VIDEO TAPE CASSETTE WINDING DEVICE

BACKGROUND OF THE INVENTION

1. Field of the Invention

This invention relates in general to hand held winding devices, and more particularly to such devices useful in winding video tape on a video tape cassette.

2. Prior Art

Special problems occur when it is desired that only a short portion of a video tape be wound. The constant mechanical winding and rewinding of the video tape will in many instances result in the video tape becoming slack about the tape reel along certain segments of the video tape. If this slack is not removed poor quality video or audio may occur, or the tape or VCR could be damaged.

Another problem particular to persons who operate a video tape rental store is the need to physically inspect certain segments of the video tape to determine if there are any flaws in the tape. This creates a further problem because it is necessary to depress and hold a release pin to allow a front panel of the top casing of the cassette to pivot upward to expose the video tape.

Although there are mechanical devices for winding and rewinding video tape none are designed to easily and effectively allow the removal of slack from a segment of the video tape or to allow physical inspection of a segment of the video tape while it is being slowly wound about the tape reel.

The present practice is to try and hold the cassette in one hand while pushing a pencil point or similar device in the reel release mechanism recessed opening while inserting a coin or similar object into the geared cavity of one of the tape reels. With the tape winding release mechanism activated the pencil is then held in position by pressing the person's body against it in order to free up one hand to press in the release pin to allow the hinged front of the top casing to be lifted and held in that position. Then with the pencil point still pressing down on the release mechanism the coin is twisted to turn the tape reel. This procedure is at best awkward and slow.

Hand held winding devices designed particularly for audio tape cassettes, such as seen in Arbib U.S. Pat. No. 3,999,725 issued Dec. 28, 1976 and entitled "Device for Transferring Magnetic Recording Tape from One Hub to Another in Tape Cassette," or Traulson U.S. Pat. No. 4,147,314 issued Apr. 3, 1979 and entitled "Winding Tool for Magnetic Tape Cassettes," or Gilmore U.S. Pat. No. 4,703,903 issued Nov. 3, 1987 and entitled "Cassette Tape Winding Device" do not address the tape winding release mechanism problem as there is no reel release mechanism in audio tape cassettes.

OBJECTS AND SUMMARY OF THE INVENTION

Therefore, it is an object of this invention to provide a hand held device for winding video tape about a tape reel in a video tape cassette.

Another object of the invention is to provide such a hand held video tape winding device that allows ease of use while allowing visual inspection of the audio tape during the winding procedure.

Still another object of this invention is to provide a video tape winding device that not only winds video tape, but also activates the reel release mechanism to allow the winding of the video tape on the tape reel.

These and other objects and advantages of this invention shall become apparent from the description of the invention set forth herein.

Accordingly, a device for hand winding video tape about the tape reels of a video tape cassette having a reel release mechanism recessed on the same side of the video tape cassette as the exposed gears of the tape reels which comprises an elongated member having at one end an opening extending through the member, an assembly extending through the opening which comprises (i) an axle shaft extending through the opening, (ii) a cog fixedly attached to one end of the axle shaft and shaped to operatively engage one of the winding gears, and (iii) a handle fixedly attached to the other end of the axle shaft for rotating the axle shaft and the cog, and a means fixedly attached to and extending outward from the member at a position to operatively engage the release switch when the cog has operatively engaged one of the winding gears.

PREFERRED EMBODIMENTS OF THE INVENTION

Figure 1:
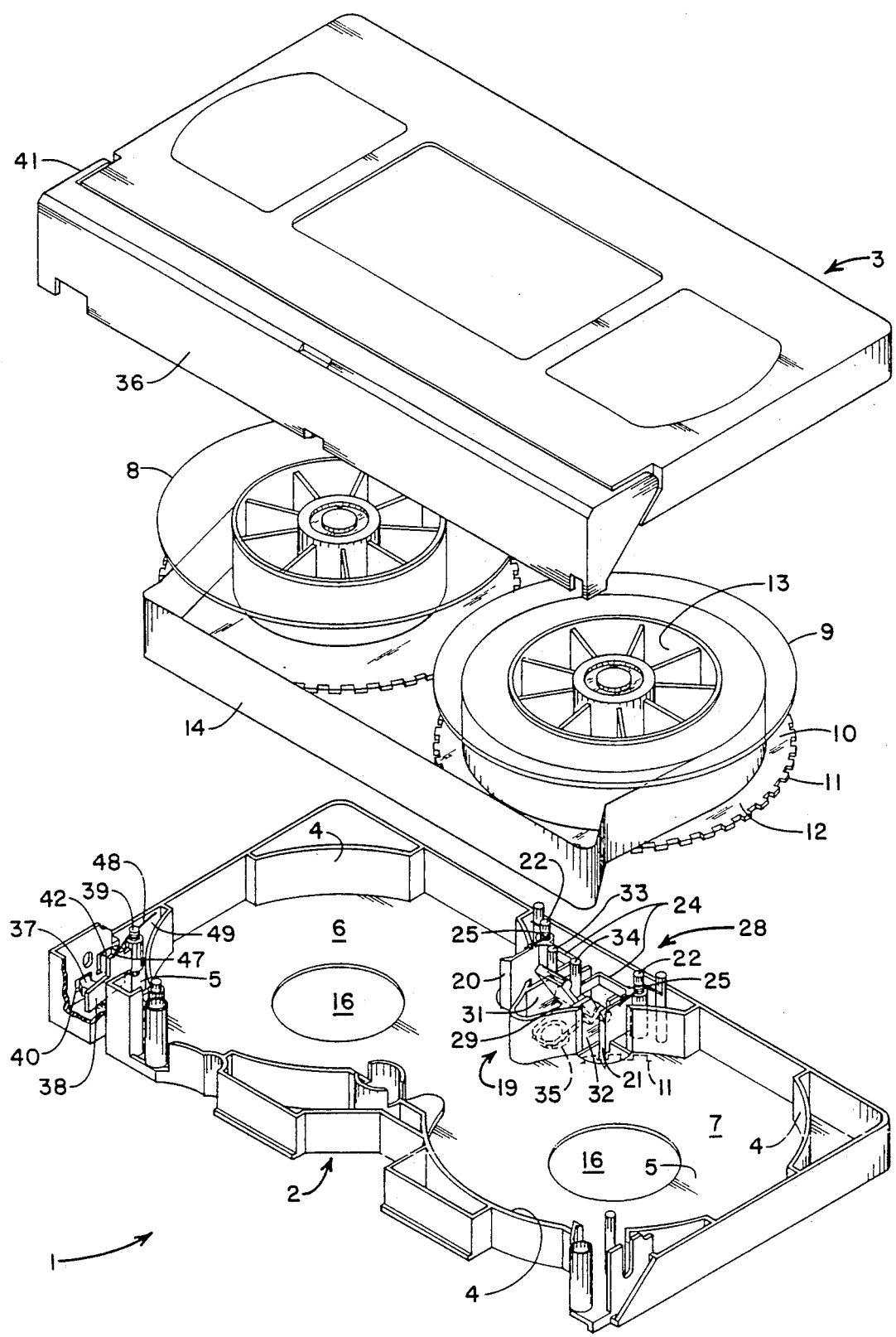
FIG. 1 is an exploded view of a conventional video tape cassette with which the invention is designed to work.

FIG. 1 illustrates an interior view of a conventional video tape cassette, denoted generally by the numeral 1, formed by a bottom and top casing member 2 and 3, respectively. The bottom casing member 2 is provided with various vertical side walls 4 that are positioned and shaped to form, along with the floor member 5 of bottom casing 2, two circular cavities 6 and 7 into which tape winding reels 8 and 9 fit in relatively loose fashion.

Figure 2:
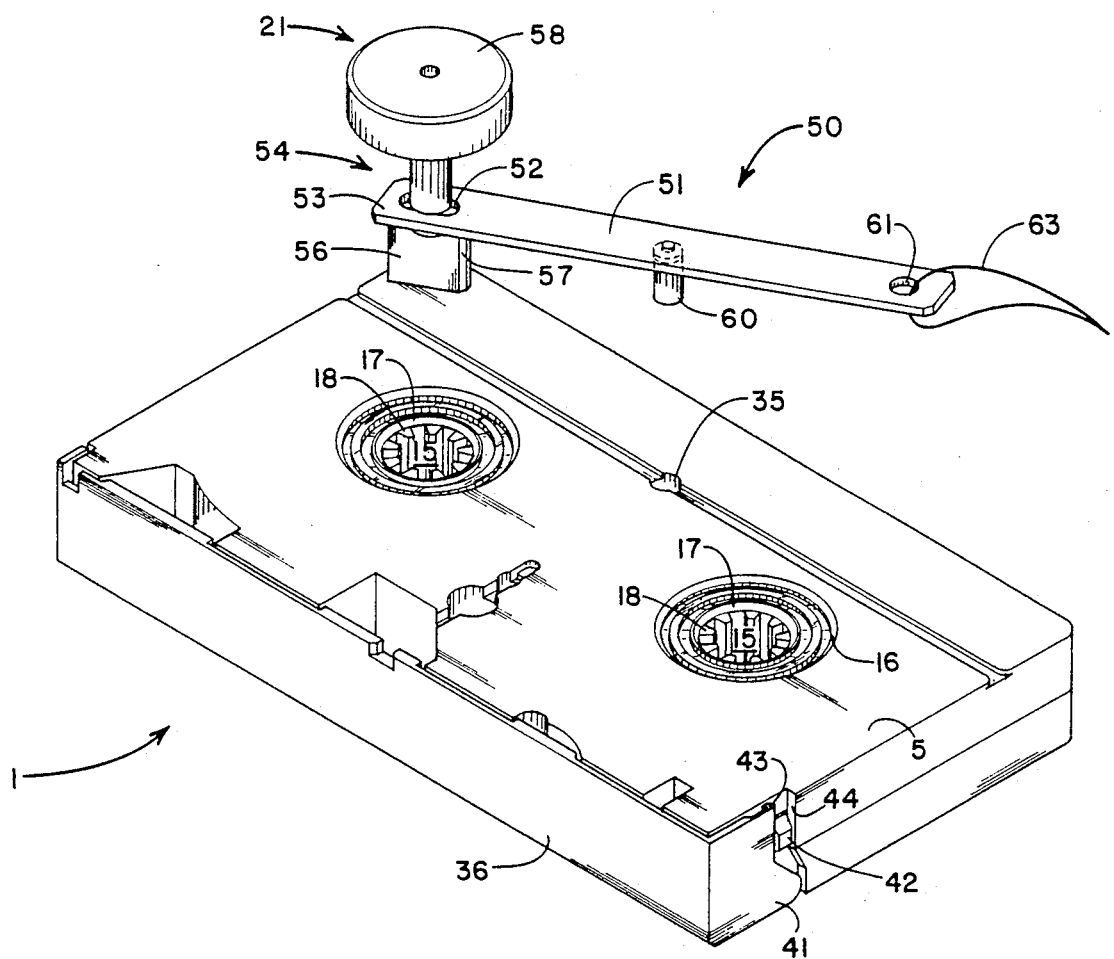
FIG. 2 is an exploded perspective view of one embodiment of the invention attached in operative position to the bottom side of a conventional video tape cassette.

Each tape winding reel is formed with a bottom plate 10 constructed with gear teeth 11 about its circumference. Mounted on the top side 12 of the bottom plate 10 is cylinder member 13 about which the video tape 14 will be wound. The cylinder member 13 is provided with a central circular cavity 15 (See FIG. 2) which opens into and corresponds with an opening 16 of the floor member 5. The side walls 17 which form cavity 15 are shaped to form gear teeth 18 protruding toward the center of the cavity 15. In this fashion gear teeth 18 are exposed through opening 16 to allow a recording/player device to operatively engage the gear teeth 18.

As best illustrated in FIG. 1, to prevent reels 8 and 9 from freely turning a gear locking assembly 19 is provided. Assembly 19 comprises two gear engaging members 20 and 21, one for each reel 8 and 9, respectively. Each gear engaging member is rotatably mounted on a vertical shaft 22 extending perpendicularly from casing floor member 5, and which has an arm 23 which operatively engages gear teeth 11 and which also has an arm release member 24. In one of the gear locking assemblies there will be a spring 25 operatively attached to the shaft 22 with one of its ends 26 pressing against one of walls 4 and its other end 27 pressing against arm 23 to force arm 23 to engage gear teeth 11.

A release assembly 28 is utilized to release arm 23 from engagement with gear teeth 11. Release assembly 28 comprises a flap member 29 attached to and extending outward from an axle member 30 that is pivotally mounted on shoulder members 31 and 32 as shown. Also extending outward from axle member 30 are two release activating arms 33 and 34 each of which contact one of the arm release members 24. Flap member 29 is positioned over opening 35 in bottom plate 10 thus affording access to flap member 29 from outside of bottom casing member 2. To activate the release assembly 28, flap member 29 is pushed from outside casing member 2 inward. This action causes axle member 30 to rotate which in turn causes the release activating arms 33 and 34 to push against arm release members 24. As arm release members 24 are moved gear engaging members 20 and 21 become disengaged from gear teeth 11 allowing rotation of winding reels 8 and 9.

To view video tape 14 as it is being wound top casing member 3 is provided with a hinged front 36 that when lifted exposes a segment of the video tape 14. The hinged front 36 is locked in a downward position by pin 37 which extends outward from plate member 38 rotatably attached to vertical shaft 39 affixed to casing floor member 5. Pin 37 extends into cavity 40 located in side panel 41 of hinged front 36. Also extending outward from plate member 38 is release pin 42 that is accessible from outside of tape cassette 1 in that it extends between the slot formed by the edge 43 of side panel 41 and the edge 44 of top casing member 3. Pin 37 is maintained in cavity 40 by the action of spring 45 which is mounted on shaft 39 and has one end 47 pressed against plate member 38 and its other end 48 pressed against wall member 49 of bottom casing member 2 as shown. To remove pin 37 from cavity 40 to allow hinged front 36 to be pivoted upward release pin 42 is pressed inward.

Figure 3:
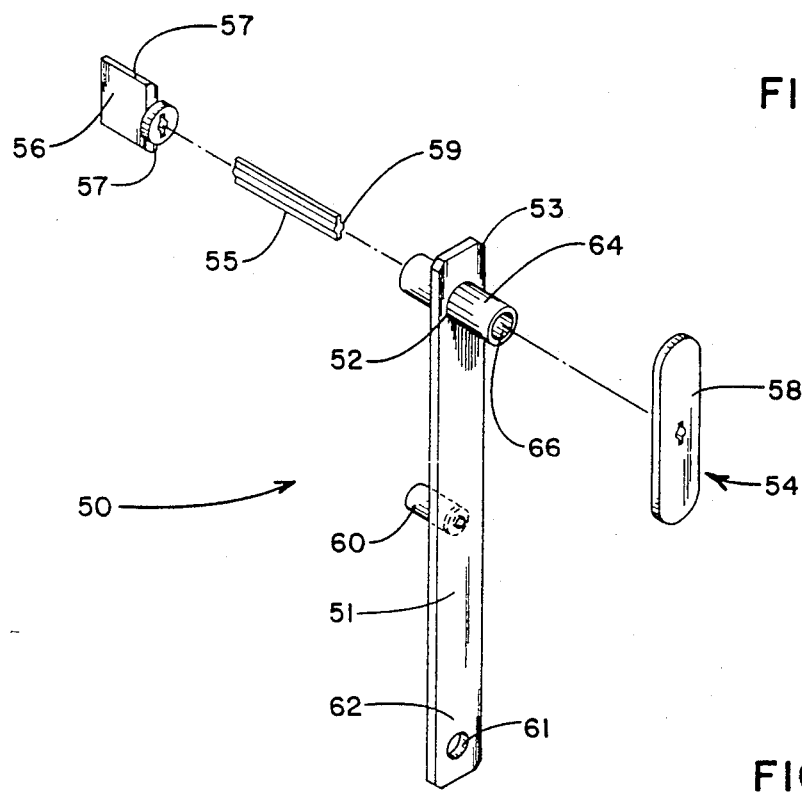
FIG. 3 is an exploded view of a preferred embodiment of the invention.

As reflected in FIG. 3 one preferred embodiment of this invention relates broadly to a tape winding device, denoted generally by the numeral 50, for use with the standard VHS video tape cassette 1 described above.

The tape winding device 50 comprises a flat bar member 51 having an axle opening 52 at its top end section 53; a winding assembly 54 comprising an axle shaft 55 which extends through axle opening 52, a gear cog 56 having teeth members 57 shaped and positioned relative to one another to operatively engage the gear teeth 11 when the winding device 50 is being operated, and a winding handle 58 fixed attached to the other end 59 of axle shaft 55 in a manner to cause the gear cogs 56 to rotate as the handle 58 is being rotated; and a tape release switch pin 60 attached to bar member 51 and extending outward therefrom at a position to enter the bottom casing opening 35 and operatively contact flap member 29.

In a preferred embodiment of the invention a second opening 61 is provided in the bottom end section 62 of the bar member 51 to allow the connection of a lanyard 63 or similar device.

In another preferred embodiment the winding assembly 54 further comprises a hollow sleeve member 64 extending through opening 52 and is fixedly attached to the side walls 65 which form opening 52. In a more preferred embodiment opening 52 will not be circular in cross-section and hollow sleeve member 64 will have a cross-section similar to that of opening 52 so that when pressed through opening 52 a tight, snug fit occurs to reduce or prevent any rotation of sleeve member 64 when handle 58 is being turned. In these embodiments axle shaft 55 extends through the passageway 66 of sleeve member 64.

In operation tape winding device 50 is aligned with tape cassette 1 so that pin 60 extends into opening 35 and cog gear teeth members 57 engage gear teeth 11. With the winding device 50 those held in that position with one hand, handle 58 can be turned to move the tape from one reel to the other reel. If one also desires to view the video tape 14 as it is being wound, then the release pin 42 is depressed with one hand and the hinged front 36 lifted and held in position by the same hand. In a preferred embodiment bar member 51 be of sufficient length that a person can use the same hand not only to hold the lifted hinged front 36 but also the hold the tape winding device 1 in place while the other hand is used to operate winding handle 21.

Figure 4:
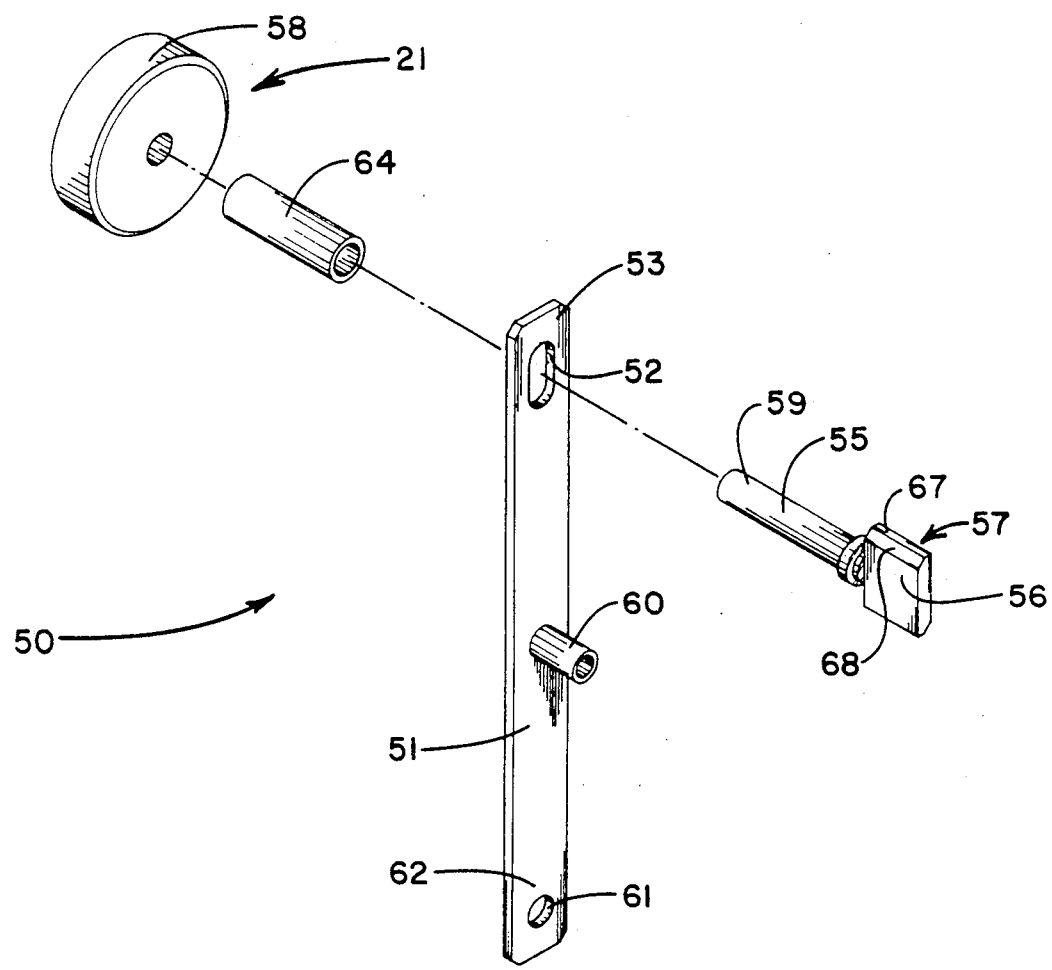
FIG. 4 is an exploded view of an alternate preferred embodiment of the invention.

In an alternate embodiment illustrated in FIG. 4 opening 52 is slot shaped to allow axle 55 the degree of movement away from or toward pin 60 required to accommodate the distance from opening 35 and cavity 15 which varies depending on the name brand of the cassette 1. In this embodiment sleeve member 64 is eliminated. It is further preferred that handle 58 be wheel shaped for easier turning. Finally, it is preferred the teeth 57 of gear cog 56 be formed by sloping sides 67 and 68 that meet to form an overall arcuate shaped surface.

There are of course other alternate embodiments which are obvious from the foregoing descriptions of the invention which are intended to be included within the scope of the invention as defined by the following claims.

What I claim is:

1. A device for hand winding video tape on a video tape cassette having exposed tape reel winding gears located on one side of the cassette the free rotation of which is controlled by a release switch operative access thereto being through a recess located on the same side of the cassette as the winding gears, which comprises:
   (a) an elongated member having at one end an opening extending through the member,
   (b) an assembly extending through the opening which comprises:
      (i) an axle shaft extending through the opening,
      (ii) a cog fixedly attached to one end of the axle shaft and shaped to operatively engage one of the winding gears, and
      (iii) a handle fixedly attached to the other end of the axle shaft for rotating the axle shaft and the cog, and
   (c) a means fixedly attached to and extending outward from the member at a position to operatively engage the release switch when the cog has operatively engaged one of the winding gears.

2. A device according to claim 1 wherein the elongated member is a flat bar.

3. A device according to claim 2 wherein a second opening extends through the elongated member at its opposite end.

4. A device according to claim 3 which further comprises:
   (d) a lanyard extending through the second opening and fixedly attached to the elongated member.

5. A device according to claim 1 wherein the assembly further comprises:

(iv) a hollow sleeve member extending through the opening and fixedly attached to side walls forming the opening, and through which the axle shaft passes.

6. A device according to claim 1 wherein the means comprises a pin member attached at one end to the elongated member and extending perpendicularly therefrom in the same direction as the cog.

7. A device according to claim 1 wherein that portion of the cog operatively engaging the tape reel winding gear is shaped to engage only two teeth of the winding gear at one time.

8. A device according to claim 7 wherein said portion has an arcuate shaped surface engaging the tape reel winding gear.

9. A device according to claim 1 wherein said opening is slot shaped to permit movement of said axle toward or away from said means.

* * * * *